May 13, 1947.   C. S. TEGGE   2,420,574
ELECTRICAL MEASURING APPARATUS
Filed Aug. 29, 1944

INVENTOR.
CARLTON S. TEGGE
BY
E. B. Spangenberg
ATTORNEY.

UNITED STATES PATENT OFFICE 2,420,574

ELECTRICAL MEASURING APPARATUS

Carlton S. Tegge, Haddon Heights, N. J., assignor to The Brown Instrument Company, Philadelphia, Pa., a corporation of Pennsylvania Application August 29, 1944, Serial No. 551,760

5 Claims. (Cl. 171—95)

The general object of the present invention is to provide improved potentiometric measuring apparatus adapted for use in separately and successively measuring the voltages of a plurality of thermocouples in such manner as to produce a suppression scale difference between the voltage measurements of one group of the thermocouples and the voltage measurements of another group of the thermocouples. The invention is of especial utility when the voltages of thermocouples of one group are in a scale range different from the voltage scale range of the thermocouples of another group. Such different thermocouple voltage ranges may result from differences in the materials of which the thermocouples are made, or from differences in the temperatures to which the thermocouples are subjected, or from both such differences. The average normal voltage of the thermocouples of one group may differ from the average normal voltage of the thermocouples of another group by an amount corresponding to a temperature difference which may be hundreds of degrees in some cases and may be much smaller in other cases.

The primary specific object of the present invention is to provide practically effective measuring apparatus adapted for the above stated use and comprising simple and effective means for successively connecting the various thermocouples into the measuring circuit network of a multiple range recording potentiometer, one at a time and in a predetermined sequence, and to produce a scale suppression difference between the measurements of thermocouples in different groups in consequence of the differences in the order in said sequence in which the thermocouples are connected into said network. To the attainment of this object, I provide a selector switch mechanism comprising stationary and movable contacts and conductor connections through which some of said contacts are connected to the terminals of the various thermocouples and others are connected to the measuring circuit network, and comprising means for progressively connecting the movable contacts to the different stationary contacts, so as to thereby successively and operatively connect the different thermocouples to the measuring circuit network in said predetermined sequence.

In a preferred embodiment of my invention, the selector switch mechanism comprises movable switch contacts or brushes carried by a rotatable shaft, and said movable and stationary contacts and shaft are so relatively arranged that in the course of a single complete revolution of said shaft, the different thermocouples, whose voltages are to be measured, are successively connected one at a time in the measuring circuit network in such predetermined sequence as to produce the desired suppression range difference between the measurements of the voltages of the different groups of thermocouples. However, in the practice of the invention, use may be made of selector switch mechanisms of other forms.

With the means described for effecting a scale suppression difference between the voltage measures of groups of a multiplicity of thermocouples it is practically feasible to increase the accuracy of the measurements by making the common scale to which all of the voltages are measured more open than would otherwise be possible. Another advantage of such a suppression scale which is of especial value in the successive use of a single recording potentiometer to measure the voltage of a relatively large number of thermocouples, is that it permits of a desirable distribution transversely to the direction of record chart movement, of the voltage records of the different thermocouples.

In the use of the present invention, the thermocouples may be arranged in three or more groups and a scale suppression difference may be effected between the voltage measurements of the thermocouples of each group and those of each other group. However, it is expected that in the ordinary use of the invention, a single scale suppression difference between the voltage measurements of thermocouples arranged in two groups only, will be practically adequate and desirable.

In carrying out the present invention, the voltage of each thermocouple is measured while one terminal of the thermocouple is connected to the so called slider contact which is in the customary adjustable engagement with the slide wire resistance element of the potentiometric measuring circuit network, and while the second terminal of the thermocouple is connected to said network at a fixed point therein which is displaced from the portion of said element engaged by said contact, and which is the same for all thermocouples of the same group, but which is different from the point at which the second terminals of the thermocouples of each other group are separately connected to said network. As those skilled in the art will recognize, when the thermocouples in the two groups are connected to the potentiometer network at different points as above described, the measurements made of the voltages of one at least of the different groups of thermocouples, are of the type commonly referred to as "suppressed scale" measurements.

The various features of novelty which characterize my invention are pointed out with particularity in the claims annexed to and forming a part of this specification. For a better understanding of the invention, however, its advantages, and specific objects attained by its use, reference should be had to the accompanying drawing and descriptive matter in which I have illustrated and described preferred embodiments of the invention.

Figure 1:
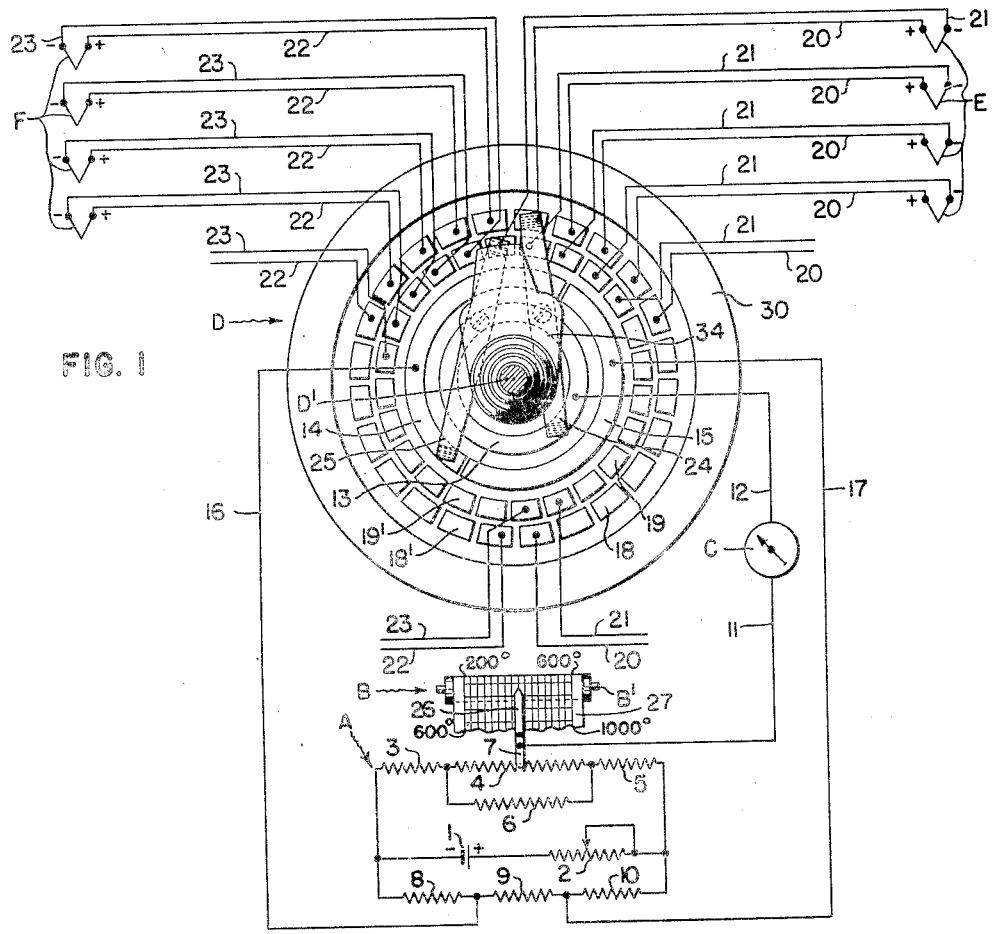
Fig. 1 is a diagram illustrating a preferred type of circuit and switch arrangement for use in the practice of the present invention.

The embodiment of the invention illustrated diagrammatically in Fig. 1, comprises a split potentiometer or bridge circuit A of conventional type, a recording mechanism B, a galvanometer C, a selector switch D, a group of thermocouples E and a second group of thermocouples F. The switch D is so connected, as hereinafter described, to thermocouples E and F and to the potentiometric network, that during one complete rotation of the rotatable shaft D' of the mechanism D, all of the thermocouples E and F will be separately connected one at a time to the potentiometric network.

The split potentiometer A comprises an energizing branch, a slidewire resistance branch, and a second resistance branch, the two resistance branches being connected in parallel with each other and each in series with the energizing branch. The energizing branch includes a circuit energizing source of current 1 and an adjustable resistance 2. The slidewire resistance branch, in the form shown, comprises resistors 3, 4 and 5, connected in series with one another, and a resistance 6 connected in parallel with the resistor 4. The latter constitutes the slide wire resistance element of the potentiometric network and is engaged by a slider or movable contact 7 adjustable along the length of the resistor 4. The second resistance branch of the split potentiometer includes resistance sections or resistors 8, 9 and 10 connected in series in the order stated between the negative and positive ends of the energizing branch of the circuit.

The circuit network shown in Fig. 1 comprises a measuring branch which in any one operative adjustment of the switch D, includes the galvanometer C, one or another of the thermocouples E and F, portions of the switch mechanism D and associated conductors through which said thermocouple and galvanometer are connected in series between displaced points of split potentiometer A. As shown in Fig. 1, the galvanometer C has one terminal connected to the slider contact 7 by a conductor 11, and a second terminal of the galvanometer is connected by a conductor 12 to a circular or ring contact 13 included in the switch mechanism D. The mechanism D includes arc shaped contacts or commutator segments 14 and 15 arranged end to end to form a complete circle except for a non-conductive gap between each two abutting contact segment ends. As shown, the contact segment 14 is connected by a conductor 16 to the potentiometer bridge circuit at the junction of its resistance sections 8 and 9, and a separate conductor 17 connects the contact segment 15 to the potentiometer bridge circuit at the junction of the resistance sections 9 and 10.

The switch mechanism D also includes a plurality of contacts 18 and 18' arranged in one circular series, and other contacts 19 and 19' arranged in a second circular series. As shown, the circular series of contacts 18 and 18' surround and are coaxial with the circular series of contacts 19 and 19', and are coaxial with and surround the circular ring contact 13, the commutator formed by the contact segments 14 and 15, and the switch shaft D'.

Each thermocouple E has its terminals 20 and 21 permanently connected to a contact 18 and to an adjacent contact 19 respectively, and similarly each thermocouple F has its terminals 22 and 23 permanently connected to a contact 18' and to an adjacent contact 19', respectively. Brushes or movable contact elements 24 and 25 are carried by the shaft D' and are so shaped and disposed relative to one another and to the stationary switch contacts, that in the course of a single rotation of the shaft D', the brush 24 successively connects the different contacts 18 and 18' to the ring contact 13, and the brush 25 successively connects the various contacts 19 to the commutator contact 14, and thereafter connects the various contacts 19' to the commutator contact 15. While the brush 24 thus connects a contact 18 or 18' to the ring contact 13, the contact 19 or 19' which is connected to the first mentioned contact through a thermocouple E or F is respectively connected by the brush 25 to a commutator contact segment 14 or 15.

As diagrammatically shown in Fig. 1, the slider contact 7 is mechanically connected to and moves with a pen arm 26. The voltage of each thermocouple E and F, when operatively connected to the potentiometric network, may be measured by the manual or automatic adjustment of the contact 7 into the position in which it engages the slide wire resistance 4 at the point thereon at which the potentiometer circuit network is balanced. In the balanced condition of the network, the voltage of the thermocouple is equal and opposite to the potential difference between the slider contact 7 and a network point which is between the potentiometer resistance sections 8 and 9, or is between the resistance sections 9 and 10, accordingly as the voltage of a thermocouple E or a thermocouple F is then being measured. The attainment of potentiometer balance is indicated by the deflective position of the galvanometer C. The suppression scale difference between the voltage measurement of a thermocouple E and that of a thermocouple F, results directly from, and its magnitude is dependent on, the potential drop in the resistance section 9.

A record chart 27 is advanced by the rotation of a shaft B' of the chart feeding drum of the recording mechanism. A record of each thermocouple voltage measurement may be made on the record chart 27 by bringing the pen arm 26 into engagement with the chart when each measuring operation is completed by the movement of the contact 7 into its position along the slide wire 4 at which the thermocouple voltage being measured establishes balance in the potentiometer network as above described.

While the apparatus shown directly measures thermocouple voltages, it indirectly measures the temperatures to which the thermocouples are subjected, since the voltage of such a thermocouple is a known function of the thermocouple temperature. In measuring thermocouple voltages, the measurements are usually expressed in temperature degrees, and not in millivolts.

The apparatus diagrammatically shown in Fig. 1 may well be included in a self balancing recording potentiometer instrument of known type, such, for instance, as the well known "Brown potentiometer" type of instrument disclosed in the Harrison et al. Patent No. 2,150,502, of March 14, 1939. In such an instrument, the chart feeding drum of the recording mechanism B is customarily rotated by a suitable timing motor operatively connected to the shaft B' of said drum, and that motor may also be connected to the switch mechanism shaft D', to rotate the latter intermittently at a suitable speed. Alternatively, in an instrument in which the time interval between successive measuring and recording operations is dependent on the time required for rebalancing, the shaft D' may be rotated by means associated with the recording mechanism in the general manner disclosed, for example, in said Patent 2,150,502. The driving connection for the shaft D' need not be illustrated since it may be of known types. Moreover, in some cases, the shaft D' may well be manually rotated.

Figure 2:
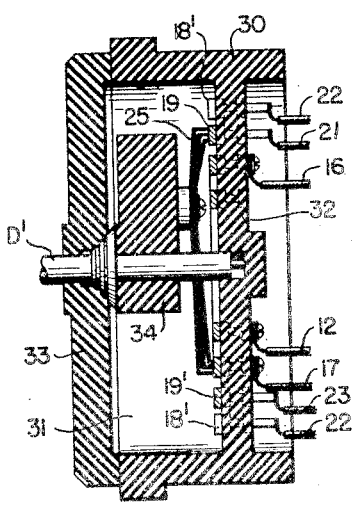
Fig. 2 is an elevation in section of a selector switch structure including switch contacts and brushes shown diagrammatically in Fig. 1.

The details of construction of the selector switch mechanism D are not essential features of my invention. The particular switch construction illustrated by way of example in Fig. 2, comprises a housing 30 formed of insulating material and enclosing a cylindrical contact chamber 31. The shaft D' extends axially through the chamber 31 and is journalled in the chamber end walls 32 and 33. The brushes 24 and 25 are mounted on an insulating support 34 within the chamber 30 and are secured to and rotated by the shaft D'. The end wall 32 is shown as integrally connected to the cylindrical wall portion of the housing surrounding the chamber 31. The contacts 18, 18', 19, 19', 13, 14 and 15 are secured to the inner side of the end wall 32 and have connector portions extending through that wall and connected at the outer side of the latter to the previously mentioned conductors 12, 16, 17, 20, 21, 22 and 23.

As shown in Fig. 1, the contacts 18 are arranged in a semi-circle and each overlaps and projects clockwise away from the contact 19, to which it is connected, and the contacts 18' and 19' are arranged in semi-circles diametrically opposed to the semi-circles of contacts 18 and 19, respectively.

As previously explained, the difference between the voltage ranges of the different groups of thermocouples depends upon the thermocouple materials and on the temperatures to which the thermocouples are exposed, and may differ widely. By way of illustration and example, assume that the thermocouples E and F are all made of the same materials; for example, of Iron and Constantan, and that the normal temperatures of the thermocouples F vary between 200° F. and 400° F., and that the normal temperatures of the thermocouples E are all between 800° F. and 1000° F. In such case, if the temperatures of the thermocouples E and F are measured to the same scale and with no scale suppression difference between the measurements and in such manner that the zero temperature end of the scale is at the left side of the record chart, and the 1000° scale mark is at the right side of the record chart, the chart records of the temperatures of the thermocouples F will all be on a portion of the chart of a width equal to a fifth of the chart width. That portion of the chart will be displaced from the left side edge of the chart by a distance equal to one-fifth of the chart width. Under the conditions, last assumed, the records on the chart of the temperatures of the thermocouples E will be located on a right-hand edge portion of the chart, of a width equal to a fifth of the chart width.

As those skilled in the art will recognize, the records formed as just described will be less accurate and less easily read than records of temperature measurements of the thermocouples E and F which are made to a more open scale, as the use of the present invention permits. In some cases, it may be advantageous to measure the temperatures of the thermocouples F to such a scale and with such scale suppression that the 200° F. temperature scale mark will be at the left edge of the chart 27, and that the 400° F. temperature scale mark will be at the right edge of said chart, and to measure the temperatures of the thermocouples E with such scale suppression that an 800° F. temperature measurement will be recorded adjacent the left side edge of the chart and a 1000° F. temperature measurement will be recorded at the right side edge of the chart. With the measurements effected in the manner just described, the records of the temperatures of the thermocouples E may be distributed over the full width of the record chart, and the records of temperatures of the thermocouples F may also be distributed over the full width of the record chart, thus permitting of maximum scale openness.

In some cases, however, it is advantageous to make use of a scale somewhat less open, and to make such a scale suppression difference between the thermocouple E and F measurements, that the temperatures of the thermocouple E will be recorded wholly or mainly on a portion of the chart laterally displaced from the chart portion on which the temperatures of the thermocouples F are wholly or mainly recorded. Thus, for example, the measuring apparatus may well be so arranged that the 200° F. mark of the scale range in which the temperatures of the thermocouples F are measured, and the 600° F. mark of that scale range, are respectively at the left and right side edges of the chart 27, as is indicated at the top of the portion of the chart shown in Fig. 1. In such case, the measurements of the temperatures of the thermocouples E may well be made in a scale range having its 600° F. mark at the left side edge, and its 1000° F. mark at the right side edge of the chart 27, as is indicated at the bottom of the chart portion shown in Fig. 1.

With the measurements effected in the two last mentioned scale ranges, the records of thermocouple F temperatures varying between 200° F. and 400° F. will be distributed over the left half of the chart 27, and the records of the temperatures of the thermocouples E varying between 800° F. to 1000° F. will be distributed over the right half of the chart 27.

As is well known to those skilled in the art, the scale of the measurements made with such apparatus as is shown in Fig. 1, depends upon the magnitude of the potential drop in the portion of the slide wire resistance 4 along which the contact 7 may be adjusted. In consequence, the measurement scale of the apparatus shown in Fig. 1 may be varied by varying the resistance of any one of the resistance sections 3, 4, 5 and 6 in the slide wire resistance branch of the split potentiometer. In ordinary practise, such a scale adjustment is effected by the replacement of one or more of the resistance sections 3, 5 and 6 by sections having different resistance value.

A change in the scale suppression difference due to the potential drop in the resistance section 9 may be effected by replacing that section by a substitute section having a different resistance. For reasons which include the provisions desirably made for automatic cold junction compensation and to facilitate recalibrating adjustments of the resistance 2, and which need not be described herein as they are well known to those skilled in the art, any change in the potential drop in the resistance section 9 would in ordinary practice involve the replacement of at least two of the three resistance sections 8, 9 and 10 by substitutes having different resistance values.

As will be apparent, the present invention is adapted for use in measuring the voltages of sources of small voltages other than thermocouples, though it is my present expectation that the invention will find its major field of use in measuring thermocouple voltages.

Figure 3:
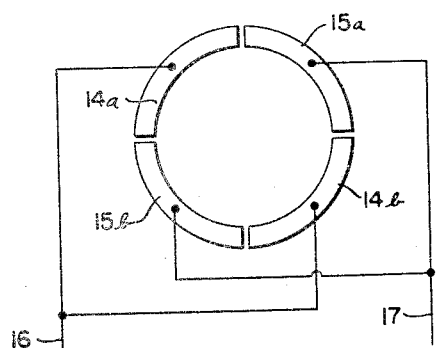
Fig. 3 is a diagram illustrating a modification of a portion of the apparatus shown in Fig. 1.

In lieu of the two commutator contacts 14 and 15 shown in Fig. 1 a greater number of such contacts may advantageously be employed in some cases. Thus, for example, use may be made of four commutator contacts 14a, 15a, 14b and 15b as shown in Fig. 3. As shown, the segments 15a and 15b are diametrically opposed and each is connected to the conductor 17 through which each of the contacts 15a and 15b may be connected in the circuit network just as is the contact 15 of Fig. 1. Similarly, the conductor 16 is connected to each of the contacts 14a and 14b, and may connect each of the latter in the circuit network just as the conductor 16 connects the contact 14 in that network in Fig. 1.

The four contacts 14a, 15a, 14b and 15b may be substituted for the contacts 14 and 15 in the switch mechanism arrangement shown in Fig. 1. In such case, the switch mechanism will be operative to successively connect the thermocouples into the network in the following order, namely: one-half of the thermocouples E, then one-half of the thermocouples F, then the remainder of the thermocouples E and then, finally, the remainder of the thermocouples F. With this arrangement, the four groups of thermocouples may be connected into the network during one complete revolution of the shaft D', whereas in the Fig. 1 arrangement the group of thermocouples E may all be connected into the network during one-half turn of the shaft D' and the thermocouples F may all be connected into the circuit during the following half turn of the shaft D'.

The commutator contact arrangement shown in Fig. 3 may be substituted for the arrangement of the contacts 14 and 15 shown in Fig. 1, for use of the switch mechanism so modified in successively measuring the temperatures of half as many thermocouples E and half as many thermocouples F as the switch mechanism shown in Fig. 1 is adapted to measure in regular succession. In using the Fig. 1 switch mechanism so modified in measuring the temperatures of the reduced number of thermocouples, each thermocouple F may have one of its terminals connected to the potentiometer network through the contact 15a, and also through the commutator contact 15b. Similarly, each thermocouple E may have one of its terminals connected to the potentiometer network through the commutator 14a and also through the commutator contact 14b.

The arrangement just described permits of the use of the switch mechanism shown in Fig. 1 for measuring the temperature of half as many thermocouples as may be connected to the switch mechanism shown in Fig. 1 without interference with the regularity or frequency of the measuring and recording operations, as would occur if the switch mechanism shown in Fig. 1 were used without change, as it may be, to measure the temperatures of many thermocouples.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. In apparatus for measuring the voltages of three or more varying voltage sources, the combination with a potentiometric bridge circuit comprising a slide wire resistance, a resistor and a source of current maintaining current flows through and potential drops in said resistance and resistor, a contact adjustable along said slide wire resistance, a current responsive device, and means including a selector switch mechanism, comprising a series of switch contacts, one for, and individually connected to each of said sources, a switch element movable to successively engage the different switch contacts one at a time and in a predetermined order, a separate conductor for, and individually connected to each of said sources, and other conductors connecting said mechanism to said device, contact and each end of said resistor, said mechanism being operable when said switch member is moved to successively engage said switch contacts, to successively connect said voltage sources, one at a time, and in a predetermined sequence, in series with said device between said contact and one end or the other of said resistor, depending in the case of each source on its position in said sequence.

2. In apparatus for measuring the voltages of a plurality of varying voltage sources different groups of which have definitely different voltage ranges, at least one of said groups including not less than two of said voltage sources, the combination with a potentiometric bridge circuit comprising a slide wire resistance, a resistor and a source of current maintaining current flows through and potential drops in said resistance and resistor, a contact adjustable along said slide wire resistance, a current responsive device, and means including a selector switch mechanism and conductors connecting said mechanism to said voltage sources, to said device and contact, and to each end of said resistor, said mechanism being operable to successively connect said voltage sources, one at a time, and in a sequence with the voltage sources of the different groups in predetermined portions of said sequence, in series with said device between said contact and one end or the other of said resistor depending in the case of each source on the portion of said sequence in which it is included, to thereby produce a scale suppression difference between the voltage measurements of the voltage sources in different groups.

3. In apparatus for measuring the voltages of three or more varying voltage sources, the combination with a potentiometric bridge circuit comprising a slide wire resistance, a resistor, and a source of current maintaining current flows through and potential drops in said resistance and resistor, a contact adjustable along said slide wire resistance, a current responsive device, and means including a selector switch mechanism comprising movable contacts, a rotatable support for said contacts rotatable about an axis and a plurality of stationary contacts distributed about said axis and each in position to be engaged by one of said movable contacts in the course of each rotation of said support, conductors connecting some of said contacts to said sources, and connecting others of said contacts to said device and to the first mentioned contact, and to each end of said resistor, said mechanism being operable in the course of one rotation of said support to successively connect said voltage sources, one at a time, and in a predetermined sequence, in series with said device between said contact and one end or the other of said resistor depending in the case of each source on its position in said sequence.

4. A combination as specified in claim 3, in which the contacts connected to the ends of said resistor are stationary contacts, each extending circularly about said axis for such angular extent as to be engaged by one contact carried by said rotatable support as the latter is successively adjusted angularly into the different positions in which another contact carried by said support engages first one and then another of a plurality of said contacts connected each to a different one of said varying voltage sources.

5. In apparatus for measuring the voltages of three or more varying voltage sources, the combination with a potentiometric bridge circuit comprising a slide wire resistance, a resistor and a source of current maintaining current flows through and potential drops in said resistance and resistor, a slider contact adjustable along said slide wire resistance, a current responsive device and means including a selector switch mechanism including one or more range selecting contacts connected to one end of said resistor and one or more other selecting range contacts connected to the second end of said resistor, the different range selecting contacts being angularly distributed about an axis, a plurality of source selecting contacts one for and individually connected to each of said sources and angularly distributed about said axis, a switch element rotatable about said axis and comprising one portion adapted to successively engage the different range selecting contacts, and a second portion successively engaging the different source selecting contacts during each rotation and associated conductors through which said second portion successively engages each of the source selecting contacts individually connected to said sources, whereby each source selecting contact when so engaged, is connected in series with the source individually connected thereto, said device and said switch element portions between said slider contact and the range selecting contact then engaged by said first portion.

CARLTON S. TEGGE.

REFERENCES CITED

The following references are of record in the file of this patent:

UNITED STATES PATENTS

| Number | Name | Date |
| --- | --- | --- |
| 2,364,923 | Smith | Dec. 12, 1944 |
| 1,537,281 | Wunsch | May 12, 1925 |
| 2,072,312 | Obermaier | Mar. 2, 1937 |